United States Patent Office 3,342,569
Patented Sept. 19, 1967

3,342,569
ALKANOL GELS
Garland George Corey, Milltown, and Edward Joseph Kenney, Bernardsville, N.J., assignors to Colgate-Palmolive Company, New York, N.Y., a corporation of Delaware
No Drawing. Filed Nov. 18, 1963, Ser. No. 324,246
9 Claims. (Cl. 44—7)

The present invention relates to new compositions of matter and, more particularly, to novel stable gels comprising one or more alcohols, nitrocellulose gelling agent, and a gel-stabilizing agent comprising those hydrophilic-hydrophobic polyoxypropylene polyoxyethylene glycols which contain fifty percent or more polyoxypropylene groups and fifty percent or less polyoxyethylene groups. Or in other words, hydrophilic hydrophobic polyoxypropylene polyoxyethylene glycols in which the polyoxypropylene groups are at least fifty percent of the substituent groups and the polyoxyethylene groups are the balance of the substituent groups.

Although alcohol-water mixtures have been gelled for about fifty years by the use of nitrocellulose as the gelling agent for use as solidified fuels, the available solidified alcohol-water fuels have not been completely satisfactory. Thus, prior art gels tend to form with a large number of relatively large pockets of the flammable liquid which, during storage, tend to release the flammable fluid with a liquid separation of the gel. In other words, previously available solid fuel gels are subject to syneresis. Solidified alcohol-water fuels to be acceptable to the trade have the following characteristics, to wit: (1) a smooth surface, (2) the gel must be firm or substantially rigid so that the gel structure does not break down during shipment, (3) two hundred grams of the gel must burn for approximately two hours, (4) the gel must have a minimum heating value of approximately 7000 B.t.u. per pound (7000 B.t.u./lb.), (5) they must burn without producing any substantial amount of soot, except in those instances where conditions surrounding the use thereof make a luminous flame desirable, (6) two hundred grams of the gel must leave substantially no residue after burning, and (7) most important the gel must not be subject to syneresis, i.e., little or no liquid bleeds from the gel during storage at a temperature in the range of 75° to 100° F. While it is advantageous to use anhydrous alcohols as the solvent for the nitrocellulose, a diluent such as water can be present in the alcohol in a concentration which does not lengthen the time required to dissolve the nitrocellulose to an industrially impractical degree or prohibit solution of the nitrocellulose.

In accordance with the present invention a stable alcohol gel comprises at least one alcohol, a nitrocellulose gelling agent in amounts sufficient to produce a firm, substantially non-macroporous, gel of said alcohol and water and a gel-stabilizing agent comprising one or more "Pluronics." Furthermore, a stable alcohol gel comprises one or more alcohols, another combustible solvent, a nitrocellulose gelling agent in amount sufficient to produce a firm, substantially non-macroporous, gel of said alcohol, other combustible fuel and water, and a gel-stabilizing agent comprising one or more "Pluronics."

Alcohols which can be employed in preparing the new compositions of the present invention include monohydroxyalcohols which exhibit the required properties of combustibility and form the aforesaid firm, substantially non-macroporous gels when gelled by the addition of nitrocellulose. Accordingly, the term "alcohol" as employed herein and in the appended claims is to be understood to include any monohydroxyalcohol which forms a gel of the desired viscosity with water and nitrocellulose, which gel burns with heat of acceptable intensity and leaves little residue after burning. Such compounds are the aliphatic alcohols having one to four carbon atoms in the molecule such as methanol, ethanol, propanol, isopropanol, butanol, isobutanol. When the requirements pertaining to the amount of soot produced are less stringent as, for example, when a luminous flame is desired, higher molecular weight monohydroxyalcohols can be used provided they are used in concentrations which do not impair the basic requirements of a solid fuel, form a stable gel with the nitrocellulose gelling agent and the "Pluronics" stabilizing agent, and have the desired combustibility to suit the paricular use.

In order to dissolve the nitrocellulose it is preferred to use anhydrous or nearly anhydrous alcohol, e.g., alcohol containing not more than one or two percent of water to form the "sol" which is then converted to a "gel" by the addition of water. Generally, it is preferred that the gels of the novel fuel-gel compositions of the present invention contain at least seventy percent of alcohol when the diluent is water providing a gel having a heating value of about 9400 B.t.u.

Although excellent fuel-gel compositions are made by using a single alcohol such as methanol or ethanol or propanol, a mixture of two or more alcohols can be utilized. When such is the case, the mixture of alcohols can be in any proportion as long as the total alcoholic content of the gel is sufficient to provide acceptable properties of combustibility. An excellent fuel-gel can be prepared which gel burns with a substantially smokeless and soot-free flame when a mixture of ethanol and methanol is used and the methanol is present in an amount of about forty percent by weight, based on the total weight of the composition.

When the requirements relating to the production of soot are less stringent, other combustible fuels, for example, hydrocarbons such as benzol, gasoline, mineral spirits and certain oxygenated compounds, such as ketones having up to six carbon atoms, e.g., acetone, methylethyl ketone, and the like although the production of soot will be to an undesirable degree for some purposes. When sooting is a stringent limitation, ketones having not more than three or four carbon atoms can be used. While the ketones have been considered hereinbefore as auxiliary fuels, the lower ketones such as acetone and methyl-ethyl ketone are primarily solvent boosters or solvents for the nitrocellulose. Accordingly, the ketones, especially the ketones having three and four carbon atoms, are considered to be auxiliary solvents rather than auxiliary fuels. Since the other combustible fuels, benzol, gasoline and the like are non-polar in nature and tend to separate from the remainder of the composition, they are usually present in relatively small amounts, preferably up to about ten percent by weight of the composition although this limitation is not critical. Greater amounts of the non-polar compound(s) can be present provided the stability and combustibility of the final composition is not adversely affected. Thus, the preferred ketones can be present as solvents to the extent of five to ten percent while the auxiliary fuels can be used in amounts up to ten percent of the composition of the sol.

The gelling agent is nitrocellulose having a nitrogen concentration in the preferred range of 11.5 to 12.5 percent.

The stabilizing agent, i.e., "Pluronics" is described in U.S. Patent No. 2,674,619. The manufacturer of "Pluronics" defines the materials "Pluronic" L–64 and "Pluronic" L–92 as polyoxypropylene polyoxyethylene polymers having the generic formula

$$HO(C_2H_4O)_m(C_3H_6O)_n(C_2H_4O)_m \cdot H$$

The manufacturer, Wyandotte Chemical Company, states that "Pluronics" L–64 and L–92 are prepared by adding propylene oxide to the two hydroxyl groups of a propylene glycol nucleus. The resulting hydrophobic base can be made to any controlled length. By adding ethylene oxide to both ends of the hydrophobic base, it is possible to put polyoxyethylene hydrophobic groups on the end of the molecule. When the polyoxypropylene polymer is the polyoxypropylene glycol having a molecular weight of at least 900 and ethylene oxide is condensed therewith in an amount constituting twenty to ninety percent of the resultant compound the subscripts in the foregoing formula have the following values:

$m$ has a value such that the oxyethylene groups constitute 20–90%, by weight, of the compound, and
$n$ is a whole number Other "Pluronics" that can be used include "Pluronics" L–64, L–62, P–75, L–92, L–103 and in general, those polyoxypropylene polyoxyethylene glycols which contain fifty percent or more polyoxypropylene groups and fifty percent or less polyoxyethylene groups. Or in other words, polyoxypropylene polyoxyethylene glycols in which the polyoxypropylene groups are at least fifty percent of the substituent groups and the polyoxyethylene groups are the balance of the substituent groups.

Illustrative of a fuel-gel composition comprising two alcohols as the combustible fuel, nitrocellulose as the gelling agent, and "Pluronic" L–64 as the gel-stabilizing or anti-syneresis agent are the following compositions.

| Component: | Weight percent A | B |
|---|---|---|
| Nitrocellulose | 1.918 | 1.827 |
| Methanol | 56.335 | 54.464 |
| Ethanol [1] | 21.415 | 20.407 |
| Dye and denaturant | 0.002 | 0.002 |
| "Pluronic" L–64 | 0.330 | 0.300 |
| Water | 20.000 | 23.000 |

[1] Specially denatured ethyl alcohol.

The gel-fuel is prepared from a base mix containing:

| | Percent |
|---|---|
| Methyl alcohol | 93.650 |
| Nitrocellulose [2] | 6.350 |

[2] Nitrogen content—11.8% to 12.2%. Viscosity of 12.2% solution—250 to 400 seconds.

From the base mix a "finished collodion" mix is prepared having the following composition.

| Component: | Weight percent |
|---|---|
| Base mix | 67.683 |
| Anhydrous ethanol [1] | 32.314 |
| Denaturant and dye | 0.003 |
| | 100.000 |

[1] Specially denatured ethyl alcohol.

From the "finished collodion" mix the fuel-gel composition is made to have the composition given hereinbefore. Thus, composition "A" was prepared by adding anhydrous methanol and "Pluronic" L–64 to the "finished collodion" mix and then gelling the collodion mix by "shocking" by the addition of water.

*Fuel-gel*

| Component: | Weight percent |
|---|---|
| Finished collodion mix | 63.73 |
| Anhydrous methanol | 15.94 |
| "Pluronic" L–64 | 0.33 |
| Water (city) | 20.00 |
| | 100.00 |

Exemplary of the buring characteristics of a fuel-gel having a composition such as that of Examples A and B are the following data:

TABLE I

| Grams Fuel-Gel Burned | "Pluronic" L–64, Percent Weight | Water, Percent Weight | Burning Time, Minutes | Maximum Temperature, ° F.[1] | Residue |
|---|---|---|---|---|---|
| 200 | 0 | 21 | 140 | 168 | No detrimental residue. |
| 200 | .33 | 21 | 135 | 167 | Do. |
| 200 | 0 | 24 | 123 | 169 | Do. |

[1] Temperature of 3,500 ml. of water being heated by the 200 g. sample.

TABLE IA
[Nitrocellulose—2 percent by weight. Sample—680 gram samples]

| Sample No. | Percent $H_2O$ | Percent Collodion | Percent "Pluronic" L–64 | Days at 78° F. | Grams [1] Free Liquid |
|---|---|---|---|---|---|
| 1 | 21 | 79 | 0 | 14 | 8 |
| 2 | 21 | 78.7 | 0.3 | 14 | 4 |
| 3 | 24 | 75.7 | 0.3 | 14 | 4 |

[1] Measured by pouring off free liquid and weighing. (The amount of free liquid is a measure of the syneresis of the gel. It will be observed that the amount of free liquid in samples Nos. 2 and 3 is only fifty percent of that of Example 1.)

Exemplary of fuel-gels containing a fuel other than an alkanol is a fuel-gel with about three percent of acetone. A base mix having the following composition is prepared.

| Component: | Weight percent |
|---|---|
| Anhydrous ethanol [1] | 82.403 |
| Nitrocellulose [2] | 8.232 |
| Acetone | 9.365 |
| | 100.000 |

[1] Specially denatured ethyl alcohol.
[2] Nitrogen content 11.8 to 12.2%; viscosity of 12.2% solution 30 to 40 seconds.

A "finished collodion" mix is prepared from the base mix to have the following composition.

| Component: | Weight percent |
|---|---|
| Base mix | 43.378 |
| Anhydrous ethanol [1] | 36.616 |
| Ethanol [2] | 20.000 |
| Denaturant and dye | 0.006 |
| | 100.000 |

[1] Specially denatured ethyl alcohol.
[2] Specially denatured ethyl alcohol.

"Pluronic" L–92 is dissolved in the finished collodion mix and the gel precipitated, i.e., shocked by the addition of water to give a final fuel-gel composition as follows.

| Component: | Weight percent |
|---|---|
| Nitrocellulose | 1.992 |
| Acetone | 3.237 |
| Ethanol | 69.315 |
| Dye and denaturant | 0.004 |
| "Pluronic" L-92 | 0.300 |
| Water | 25.152 |
| | 100.000 |

Gel "C"

| Component: | Weight percent | |
|---|---|---|
| Ethanol | 71.1 to | 65.7 |
| Methanol | 3.6 to | 3.3 |
| Acetone | 3.3 to | 3.1 |
| Solids (nitrocellulose) | 2.0 to | 1.9 |
| Water | 20.0 to | 26.0 |
| | 100.0 | 100.0 |

TABLE II
[Gel containing 20-21 percent of water]

| Sample No. | Grams of Sample | Percent "Pluronic L-92" | Days at 78° F. | Grams Free Liquid | Percent of Sample | Days at 120° F. | Grams Free Liquid | Percent of Sample |
|---|---|---|---|---|---|---|---|---|
| 1 | 200 | 0 | | | | 7 | 10 | 5 |
| 2 | 200 | 0 | | | | 7 | 11 | 5.5 |
| 3 | 200 | 0.3 | | | | 7 | 3 | 1.5 |
| 4 | 680 | 0 | 42 | 15 | 2.2 | 4 | 80 | 11.8 |
| 5 | 680 | 0.0 | 125 | 10 | 2.2 | | | |
| 6 | 680 | 0.5 | 15 | 1-2 | 1.5 | | | |
| 7 | 680 | 0.5 | 128 | | 0.3 | 4 | 8 | 1.2 |

TABLE III
[Gel containing 23-24 percent of water]

| Sample No. | Grams of Sample | Percent "Pluronic L-92" | Days at 78° F. | Grams Free Liquid | Percent of Sample | Days at 120° F. | Grams Free Liquid | Percent of Sample |
|---|---|---|---|---|---|---|---|---|
| 1 | 680 | 0 | 40 | 12 | 1.76 | 4 | 58 | 8.53 |
| 2 | 680 | 0 | 125 | 14 | 2.06 | | | |
| 3 | 680 | 0.3 | 42 | 3 | 0.44 | 4 | 50 | 7.35 |
| 4 | 680 | 0.3 | 125 | 10 | 1.47 | | | |
| 5 | 680 | 0.5 | 42 | 5-6 | 0.80 | 4 | 38 | 5.60 |
| 6 | 680 | 0.5 | 125 | 1-2 | 0.22 | | | |

TABLE IV
[Gel containing 25-26 percent of water]

| Sample No. | Grams of Sample | Percent "Pluronic L-92" | Days at 78° F. | Grams Free Liquid | Percent of Sample | Days at 120° F. | Grams Free Liquid | Percent of Sample |
|---|---|---|---|---|---|---|---|---|
| 1 | 680 | 0 | 42 | 8 | 1.18 | 4 | 48 | 7.00 |
| 2 | 680 | 0 | 125 | 9 | 1.32 | | | |
| 3 | 680 | 0.3 | 42 | 5 | 0.73 | 4 | 37 | 5.41 |
| 4 | 680 | 0.3 | 125 | 2-3 | 0.37 | 4 | 14 | 2.04 |
| 5 | 680 | 0.2 | 20 | 4 | 0.58 | 4 | 17 | 2.48 |
| 6 | 680 | 0.1 | 20 | 5 | 0.73 | 4 | 38 | 5.55 |
| 7 | 680 | 0.5 | | | | 4 | 9 | 1.32 |
| 8 | 680 | 1.0 | | | | | | |

Other fuel-gels having compositions as set forth hereinafter have been prepared in a similar manner.

| Component: | Weight percent | |
|---|---|---|
| Nitrocellulose | 1.867 | 1.867 |
| Acetone | 3.034 | 3.038 |
| Ethanol | 67.965 | 68.054 |
| Dye and denaturant | 0.005 | 0.005 |
| "Pluronic" L-92 | 0.300 | 0.200 |
| Water | 26.829 | 26.836 |
| | 100.000 | 100.000 |

The marked reduction in syneresis as measured by the grams of free liquid after ageing at room temperature (78° F.) and after accelerated aging at 120° F. is illustrated by the data presented in Tables II, III and IV hereinafter. Three gels containing respectively, "A"—20 to 21 percent of water; "B"—23 to 24 percent of water and "C"—25 to 26 percent of water were prepared. Comparisons of the amount of free liquid after storage of these gels free from a "Pluronic" and containing the indicated amount of "Pluronic L-92" is provided in Tables II, III and IV.

The gels employed for illustrating the effect of "Pluronics" upon syneresis of nitrocellulose gels had compositions within the set forth hereinafter and differed only by the concentration of water.

Even cursory examination of the data presented in Tables II, III and IV establishes that 0.1 percent of "Pluronic" is sufficient to reduce the syneresis of a nitrocellulose-alcohol-water gel a practical amount. On the other hand, an amount of "Pluronic L-92" in excess of 0.5 percent, for example, one percent, converts the gel from a firm gel to a mush. Thus, the use of concentrations in excess of 0.5 gel percent is not recommended.

From the foregoing description of the present invention those skilled in the art will recognize that the present invention provides a stable composition comprising one or more alcohols as the major component, a nitrocellulose gelling agent in amount sufficient to form a gel say about one to about three percent, about 15 to 30 percent of water, and about 0.1 to about 0.5 percent of "Pluronic L-64," "Pluronic P-75," "Pluronic L-62," "Pluronic L-92," "Pluronic L-103" or in general a hydrophilic-hydrophobic polyoxyalkylene-polyoxypropylene in which the polyoxypropylene moiety has a molecular weight of at least 900 and constitutes about 50 to about 90 percent of the compound. Those skilled in the art will understand that non-polar fuels in amounts up to about 10 percent can be included in the mixture and that denaturants, dyes, and odorants also can be admixed with the basic components of the mixture.

What is claimed is:

1. A stable alcohol gel composition comprising a major proportion of at least one aliphatic monohydroxy alcohol, a minor proportion, sufficient to form a gel with said alcohol, of nitrocellulose, about 15 to about 30 percent of water, and about 0.2 to 1.0 percent of at least one hydrophillic-hydrophobic polyoxyalkylene polyoxypropylene in which the polyoxypropylene moiety has a molecular weight of at least 900 and constitutes about 50 to 90 percent of the said polyoxyalkylene polyoxypropylene.

2. An alcohol gel composition as set forth in claim 1 wherein the alcohol constitutes about 65 to about 80 percent of the total weight of the composition.

3. An alcohol gel composition as set forth in claim 1 wherein the alcohol constitutes about 65 to 80 percent of the total weight of the composition and the alcohol has one to four carbon atoms in the molecule.

4. An alcohol gel composition as set forth in claim 1 containing up to about 10 percent of at least one of an auxiliary fuel and a ketone having not more than six carbon atoms.

5. An alcohol gel composition as set forth in claim 1 containing up to about ten percent of acetone.

6. An alcohol gel composition as set forth in claim 1 containing up to about ten percent of an auxiliary fuel selected from the group consisting of benzol, gasoline, and mineral spirits.

7. An alcohol gel composition comprising

| Component: | Weight percent |
|---|---|
| Aliphatic alcohol having 1 to 4 carbon atoms | 66.5 to 82.9 |
| Nitrocellulose (11 to 13% nitrogen) | 2.5 to 1.9 |
| Water | 30.0 to 15.0 |
| Polyoxypropylene polyoxyethylene | 1.0 to 0.1 |
| Dyes, denaturants, odorants—Balance to make 100%. | |

8. A stable alcohol gel composition comprising by weight about 56.5 to 77.3 percent of at least one aliphatic monohydroxy alcohol, about 1.5 to 2.5 percent of nitrocellulose containing 11 to 13 percent nitrogen, about 20 to 30 percent water, about 0.1 to 0.5 percent of at least one hydrophilic-hydrophobic polyoxyalkylene polyoxypylene in which the polyoxypropylene moiety has a molecular weight of at least 900 and constitutes about 50 to 90 percent of the said polyoxyalkylene polyoxypropylene, about 1 to 10 percent of an auxiliary fuel and ketone, and the balance of the composition to make 100 percent being dyes, denaturants and odorants.

9. An alcohol gel composition as set forth in claim 8 wherein the ketone is acetone.

References Cited

UNITED STATES PATENTS

| 2,504,196 | 4/1950 | Holmes | 44—7 |
| 2,613,142 | 10/1952 | Wiczer | 44—7 |
| 3,072,467 | 1/1963 | Wiczer | 44—7 |

FOREIGN PATENTS 841,738  7/1960  Great Britain.

OTHER REFERENCES

"Pluronics," Wyandotte Chemicals Corporation, Wyandotte, Mich. (Rec'd in Scientific Library, Jan. 7, 1957).

DANIEL E. WYMAN, *Primary Examiner.*

C. F. DEES, *Assistant Examiner.*